United States Patent [19]
Cooperman et al.

[11] Patent Number: 5,721,833
[45] Date of Patent: Feb. 24, 1998

[54] PUSH-OUT OF LOW PRIORITY SIGNALS FROM SWITCH BUFFERS

[75] Inventors: Michael Cooperman, Framingham; D. Dean Casey, Sudbury, both of Mass.

[73] Assignee: GTE Laboratories Incorporated, Waltham, Mass.

[21] Appl. No.: 580,728

[22] Filed: Dec. 29, 1995

[51] Int. Cl.$^6$ ................................................. G06F 3/00
[52] U.S. Cl. .................. 395/250; 395/876; 395/872
[58] Field of Search ........................ 395/876, 250, 395/873, 877, 880, 872

[56] References Cited

U.S. PATENT DOCUMENTS

| | | | |
|---|---|---|---|
| 5,267,232 | 11/1993 | Katsube et al. | 370/230 |
| 5,287,346 | 2/1994 | Bianchini, Jr. et al. | 370/390 |
| 5,513,134 | 4/1996 | Cooperman et al. | 365/49 |
| 5,528,763 | 6/1996 | Serpanos | 395/250 |
| 5,541,913 | 7/1996 | Witters et al. | 370/252 |
| 5,550,815 | 8/1996 | Cloonan et al. | 370/396 |
| 5,550,823 | 8/1996 | Irie et al. | 370/413 |
| 5,553,061 | 9/1996 | Waggener, Jr. et al. | 250/491.1 |

*Primary Examiner*—William M. Treat
*Assistant Examiner*—Zarni Maung
*Attorney, Agent, or Firm*—Leonard C. Suchyta

[57] ABSTRACT

An apparatus and method for push-out of signals from switch buffers ensures that a high percentage of the highest priority input signals are accepted by the switch by using the switch resources to remove lower priority input signals from the switch buffer in order to accommodate higher priority input signals. Signals of any priority may be pushed out of the switch buffer. The apparatus requires a queue with simultaneous read and write capability and a switch that performs one read operation to N write operations, N being the number of input ports. It pushes signals out of the buffer by performing additional "dummy" read operations to read out signals of the specified priority, and then discards the signals by preventing them from entering the parallel-to-serial shift registers. A preferred embodiment of the invention utilizes an ATM CAM-controlled switch fabric, where the CAM receives the arrival number and priority of each cell in the buffer. The location of low priority cells is found by activating a dummy read priority line and addressing the CAM.

9 Claims, 1 Drawing Sheet

' # 5,721,833

PUSH-OUT OF LOW PRIORITY SIGNALS FROM SWITCH BUFFERS

FIELD OF THE INVENTION

The present invention relates to electronic data communications systems and, in particular, to high speed electronic signal switching systems.

BACKGROUND

Input signals entering a signal switch generally have different priorities that depend on their importance. When such signals contend for the same output port of the switch, the signals with a higher priority will be sent to the output first while the lower priority signals will be stored in the switch buffer. During heavy traffic it is possible for the lower priority input signals to completely fill the switch buffer, leaving no room for incoming higher priority signals. Under such conditions it is desirable to be able to selectively push lower priority signals out of the switch buffer in order to make room for higher priority signals. This has generally been difficult to achieve because it requires the ability to identify where the lower priority signals are in the switch buffer.

For this reason, many prior art signal discard schemes operate by discarding lower priority signals before they enter the switch buffer. Under such a scheme, once a lower priority signal has been admitted to the buffer it often cannot be discarded, leading to a variety of inefficiencies and problems. For example, an output cycle may need to be used to send a low priority signal to the output in order to free the buffer location to receive a higher priority signal. This occurs at the expense of being able to output a higher priority signal during that cycle. Another possibility is that the lower priority signal may become trapped in the buffer indefinitely while higher priority signals are selectively sent to output before it. In the meantime, higher priority signals are being lost because they cannot get into the switch buffer. In addition, such schemes sometimes require that the lower priority signals begin to be discarded at preset buffer occupancy levels that vary depending on priority. This means that lower priority signals will begin to be lost long before the buffer is completely full, leading to a much higher than necessary rate of signal loss.

OBJECTS OF THE INVENTION

Accordingly, the primary object of the present invention is to ensure that a high percentage of the highest priority input signals are accepted by the switch, even during heavy traffic.

A particular object of the invention is to efficiently use switch resources to remove lower priority input signals from the switch buffer when necessary to accommodate incoming higher priority input signals.

SUMMARY

The apparatus and method for buffer signal push-out of the present invention use dummy read operations to selectively push signals of any priority out of a switch buffer. The apparatus requires a queue with simultaneous read and write capability and a switch that performs one read operation to N write operations, with N being the number of input ports. A preferred embodiment of the invention utilizes an ATM CAM-controlled switch fabric.

During any particular time slot, N input signals may be written to the queue but only one signal is written to the output. The result is that the read operation only takes up part of the available time slot. The present invention uses the remaining part of the time slot to push low priority input signals out of the buffer by performing additional "dummy" read operations to read out the low priority signals, followed by discarding the signals by preventing them from entering the parallel-to-serial shift registers. The location of low priority cells is found by activating the appropriate dummy read priority line and addressing the CAM, which contains the arrival number and priority of each cell in the buffer. The address of the location in the queue that was occupied by the discarded cell is still written in the usual manner to the FIFO so that it may be used in storing an incoming cell.

DETAILED DESCRIPTION OF THE PREFERRED EMBODIMENT

Figure 1:
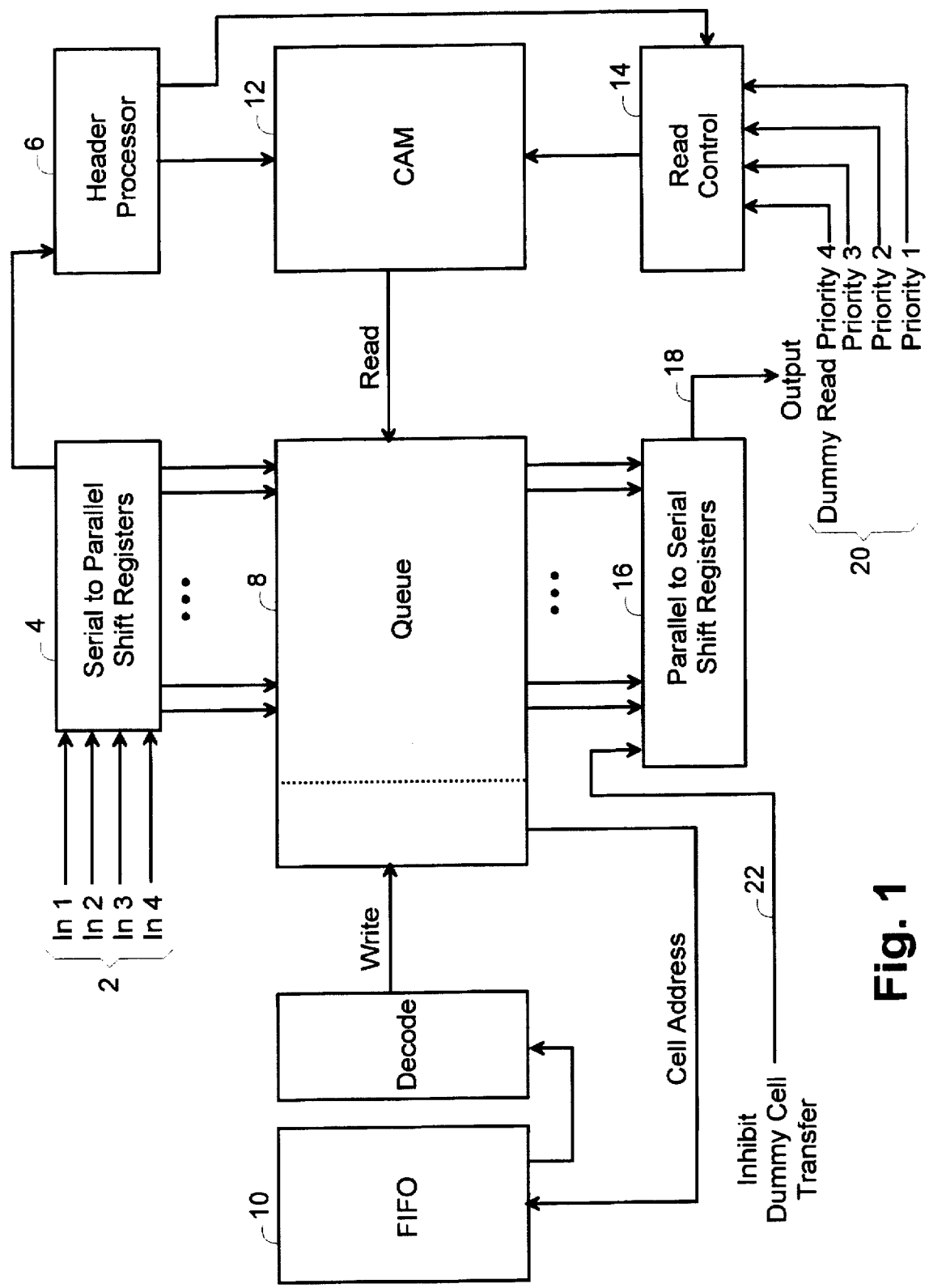
FIG. 1 is a logical block diagram of a 4×1 ATM switch fabric with a CAM-controlled buffer utilizing signal push-out according to the present invention.

The apparatus and method for buffer signal push-out of the present invention allow selective push-out of signals of any priority from a switch buffer in order to make room for different priority signals. The apparatus requires a queue (buffer) with simultaneous read and write capability, and a switch that performs one read operation to N write operations, where N is the number of input ports. A preferred embodiment of the invention utilizes the output-buffered ATM CAM-controlled switch fabric disclosed in application Ser. No. 08 391009, *ATM Shared Memory Switch with Content Addressing*, herein incorporated by reference, to switch asynchronous transfer mode (ATM) cells. This embodiment is shown FIG. 1 for a 4-input to 1-output configuration.

In a CAM-controlled ATM switch, ATM cells are read from input ports 2 into serial-to-parallel shift registers 4 during the first time slot and are each assigned an arrival number by a header processor 6. These cells are then written during the subsequent time slot into a buffer (Queue) 8 according to addresses supplied by a FIFO 10, with the arrival number and priority of each cell being written into a CAM 12. During the third time slot, a pointer supplied to the CAM 12 by a read control 14 is compared to all CAM 12 locations simultaneously. The cell in the queue 8 location corresponding to the CAM 12 location that matches the pointer is read out of the queue 8 into parallel-to-serial shift registers 16. During the next time slot, the cell is shifted serially to the output 18, with the address it occupied in the queue 8 being written into the FIFO 10 to be used for writing subsequent inputs into the queue.

In this embodiment, during any particular time slot four input signals may be written to the queue 8, but only one signal is written to the output 18. The result is that the read operation only takes up 25% of the available time slot. The present invention makes use of the remaining part of the time slot to push low priority input signals out of the buffer 8. It does this by performing additional "dummy" read operations to read out the low priority signals and then discarding the signals by preventing them from entering the parallel-to-serial shift registers 16.

In the embodiment of FIG. 1, the location of low priority cells is found by activating the appropriate dummy read priority line 20 and addressing the CAM 12, which contains the arrival number and priority of each cell in the buffer 8. Once a low priority cell has been selected for discarding, it is read out of the queue 8 by operation of the read control 14 but is prevented from entering the parallel-to-serial shift registers 16 by the operation of the inhibit dummy cell transfer signal 22. The cell has therefore been effectively discarded because it no longer has a place in memory and has not been sent to the switch output 18. The address of the location in the queue 8 that was occupied by the discarded cell will still be written in the usual manner to the FIFO 10 so that it may be used in storing an incoming cell.

The usual mode of operation of the invention is generally to discard signals of the lowest priority first, but it would be possible to use the invention to preferentially discard signals of any priority. In the embodiment of FIG. 1, priority 4 is the lowest, so dummy read priority 4 line 20 is activated first. Cells are discarded on a first-in, first-out basis. After all cells of the lowest priority have been discarded, cells of the next higher priority will be discarded, and so on. Any number of cells can potentially be discarded by using the appropriate number of dummy read operations.

Modifications and substitutions by one of ordinary skill in the art are considered to be within the scope of the present invention, which is not to be limited except by the claims which follow.

What is claimed is:

1. An apparatus for push-out of one or more of a plurality of signals, each of said signals having one of a set of priorities, from a buffer of a signal switch, said buffer having a plurality of locations, comprising, in combination:

means for writing and reading simultaneously to and from said buffer, wherein the number of reads required to output said signals from said buffer during a time slot is less than the number of writes required to input said signals to said buffer during said time slot;

means for identifying said priority and the location in said buffer of each of said plurality of signals resident in said buffer;

means for performing dummy reads of ones of said signals having a specific one of said set of priorities during the part of each of said time slots when said buffer is normally written to but not read from; and means for preventing said signals read from said buffer by said dummy reads from going to the output of said signal switch.

2. The apparatus of claim 1, wherein the number of said dummy reads during a time slot equals the number of said writes required to input said signals to said buffer during said time slot minus the number of said reads required to output said signals from said buffer during said time slot.

3. The apparatus of claim 2, wherein said buffer is CAM-controlled.

4. The apparatus of claim 3, wherein said signals are asynchronous transfer mode cells.

5. The apparatus of claim 2, wherein said priority of said signals of which said dummy reads are made is lower than said priorities of said signals that remain in said buffer or are read normally to said output.

6. The apparatus of claim 2, wherein said output of said signal switch includes a parallel-to-serial shift register.

7. A method for push-out of one or more of a plurality of signals, each of said signals having one of a set of priorities, from a signal switch, comprising the steps, in combination, of:

utilizing a buffer in said switch that has a plurality of locations and simultaneous read and write capability, wherein the number of reads required to output said signals from said buffer during a time slot is less than the number of writes required to input said signals to said buffer during said time slot;

identifying said priority and the location in said buffer of each of said plurality of signals resident in said buffer;

performing dummy reads of ones of said signals having a specific one of said set of priorities during the part of each of said time slots when said buffer is normally written to but not read from; and preventing said signals read from said buffer by said dummy reads from going to the output of said signal switch.

8. The method of claim 7, wherein the number of said dummy reads during a time slot equals the number of said writes required to input said signals to said buffer during said time slot minus the number of said reads required to output said signals from said buffer during said time slot.

9. The method of claim 8, wherein said buffer is CAM-controlled.

* * * * *